US009124778B1

(12) United States Patent
Crabtree

(10) Patent No.: US 9,124,778 B1
(45) Date of Patent: Sep. 1, 2015

(54) APPARATUSES AND METHODS FOR DISPARITY-BASED TRACKING AND ANALYSIS OF OBJECTS IN A REGION OF INTEREST

(71) Applicant: Brickstream Corporation, Norcross, GA (US)

(72) Inventor: Ralph Crabtree, Atlanta, GA (US)

(73) Assignee: Nomi Corporation, Norcross, GA (US)

( * ) Notice: Subject to any disclaimer, the term of this patent is extended or adjusted under 35 U.S.C. 154(b) by 0 days.

(21) Appl. No.: 14/014,068

(22) Filed: Aug. 29, 2013

Related U.S. Application Data

(60) Provisional application No. 61/694,525, filed on Aug. 29, 2012.

(51) Int. Cl.
*H04N 7/18* (2006.01)
(52) U.S. Cl.
CPC ..................................... *H04N 7/18* (2013.01)
(58) Field of Classification Search
None
See application file for complete search history.

(56) References Cited

U.S. PATENT DOCUMENTS

| 2004/0085451 | A1* | 5/2004 | Chang | 348/159 |
|---|---|---|---|---|
| 2007/0182818 | A1* | 8/2007 | Buehler | 348/143 |
| 2008/0291279 | A1* | 11/2008 | Samarasekera et al. | 348/159 |
| 2009/0067674 | A1* | 3/2009 | Hinkel et al. | 382/103 |
| 2010/0157149 | A1* | 6/2010 | Nobori et al. | 348/453 |
| 2011/0228981 | A1* | 9/2011 | Harres et al. | 382/103 |
| 2012/0120248 | A1* | 5/2012 | Han et al. | 348/169 |
| 2012/0169882 | A1* | 7/2012 | Millar et al. | 348/159 |
| 2013/0128052 | A1* | 5/2013 | Catrein et al. | 348/159 |

* cited by examiner

*Primary Examiner* — Frederick Bailey
(74) *Attorney, Agent, or Firm* — Morris, Manning & Martin LLP

(57) ABSTRACT

Aspects of the present disclosure generally relate to multi-sensor apparatuses and methods for using the same. In one embodiment, the present disclosure relates to an integrated multi-lens video platform with integrated software for collecting data from each lens and merging the same into a unified data output. According to one aspect, the present apparatus comprises a single integrated unit comprising two disparity-based stereo image sensors (e.g., cameras) for capturing stereo image data (e.g., relating to three-dimensional images and object-tracking) and a single high resolution sensor (e.g., camera) for capturing high resolution and/or color data. Thus, generally, one aspect of the present platform includes three (3) cameras—two cameras directed to stereo vision capabilities, and a third camera directed to high resolution uses. In other embodiments, other camera configurations, numbers, and arrangements are possible as will occur to one of ordinary skill in the art.

30 Claims, 6 Drawing Sheets

EXEMPLARY ENVIRONMENT VIEW

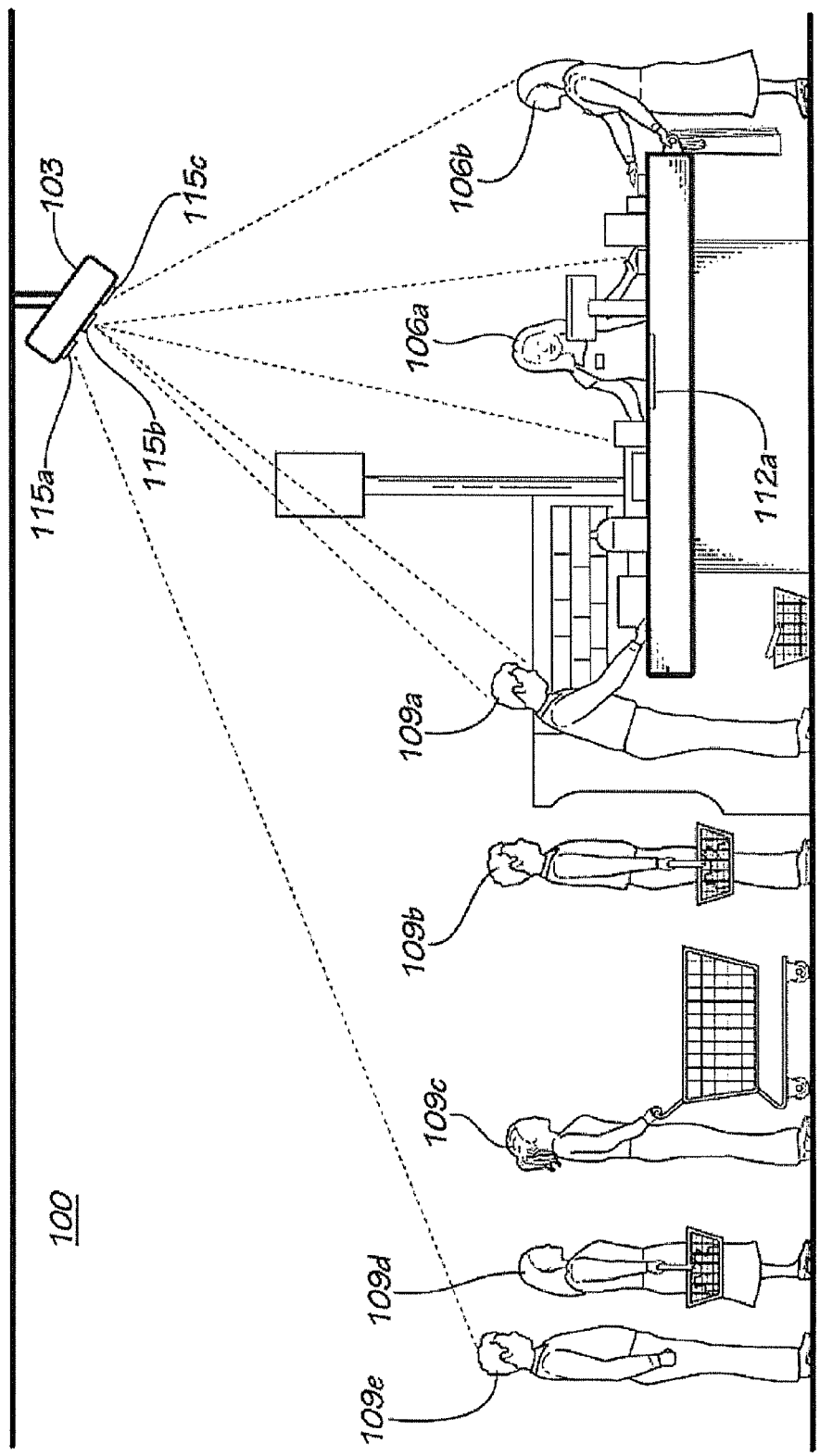
FIG. 1 – EXEMPLARY ENVIRONMENT VIEW

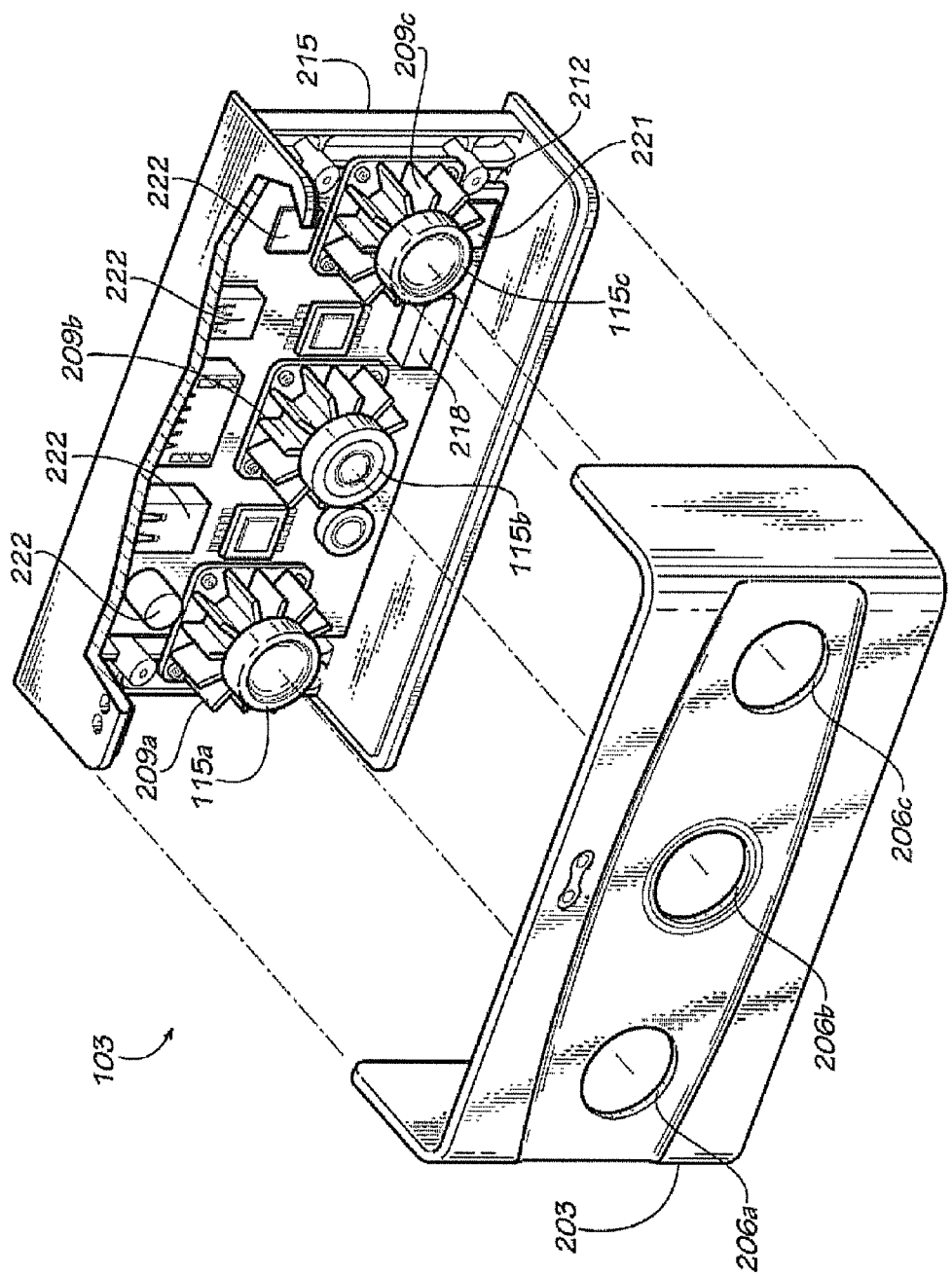
FIG. 2 – EXEMPLARY PERSPECTIVE VIEW OF DEVICE

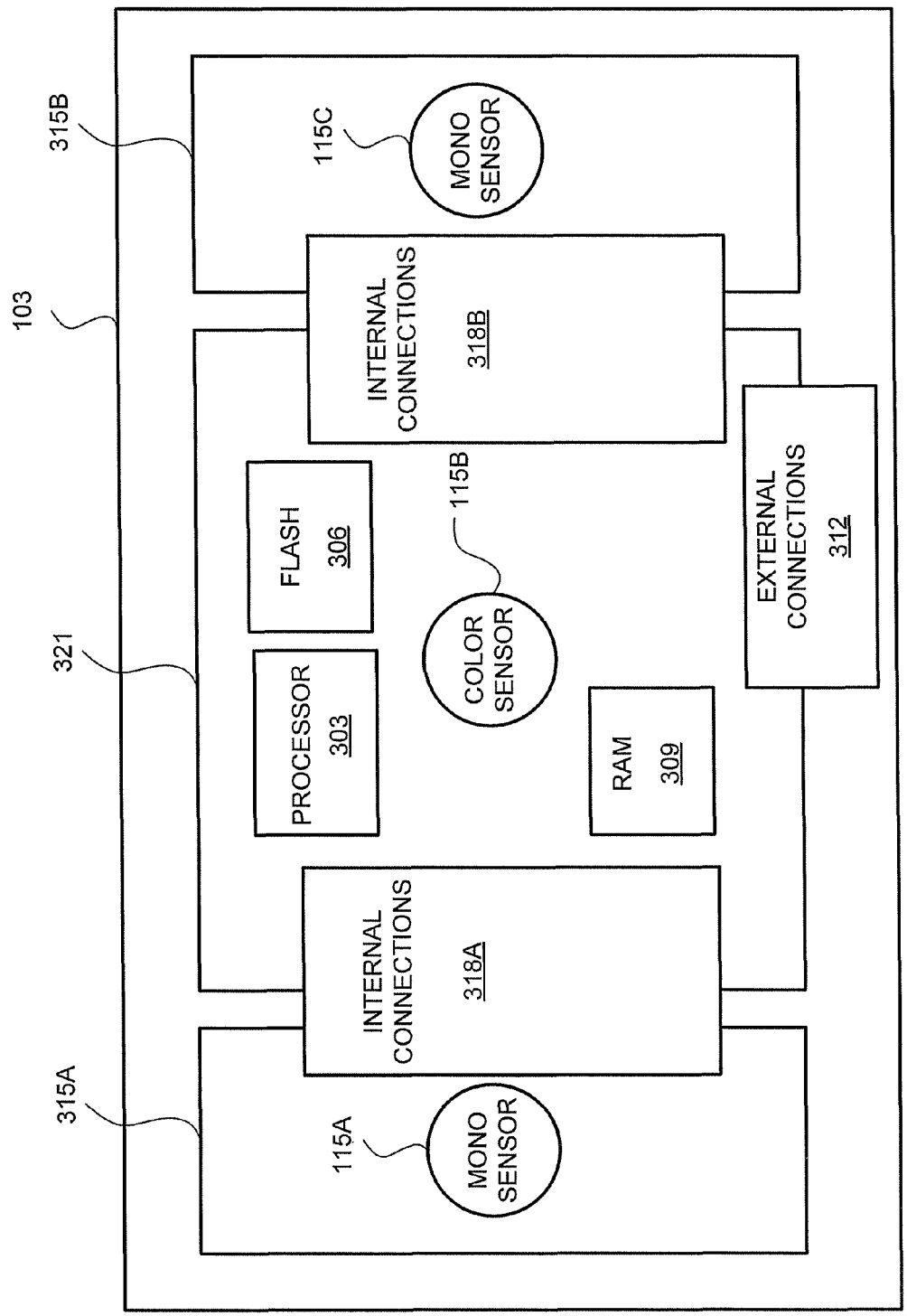
FIG. 3 – EXEMPLARY DEVICE SCHEMATIC

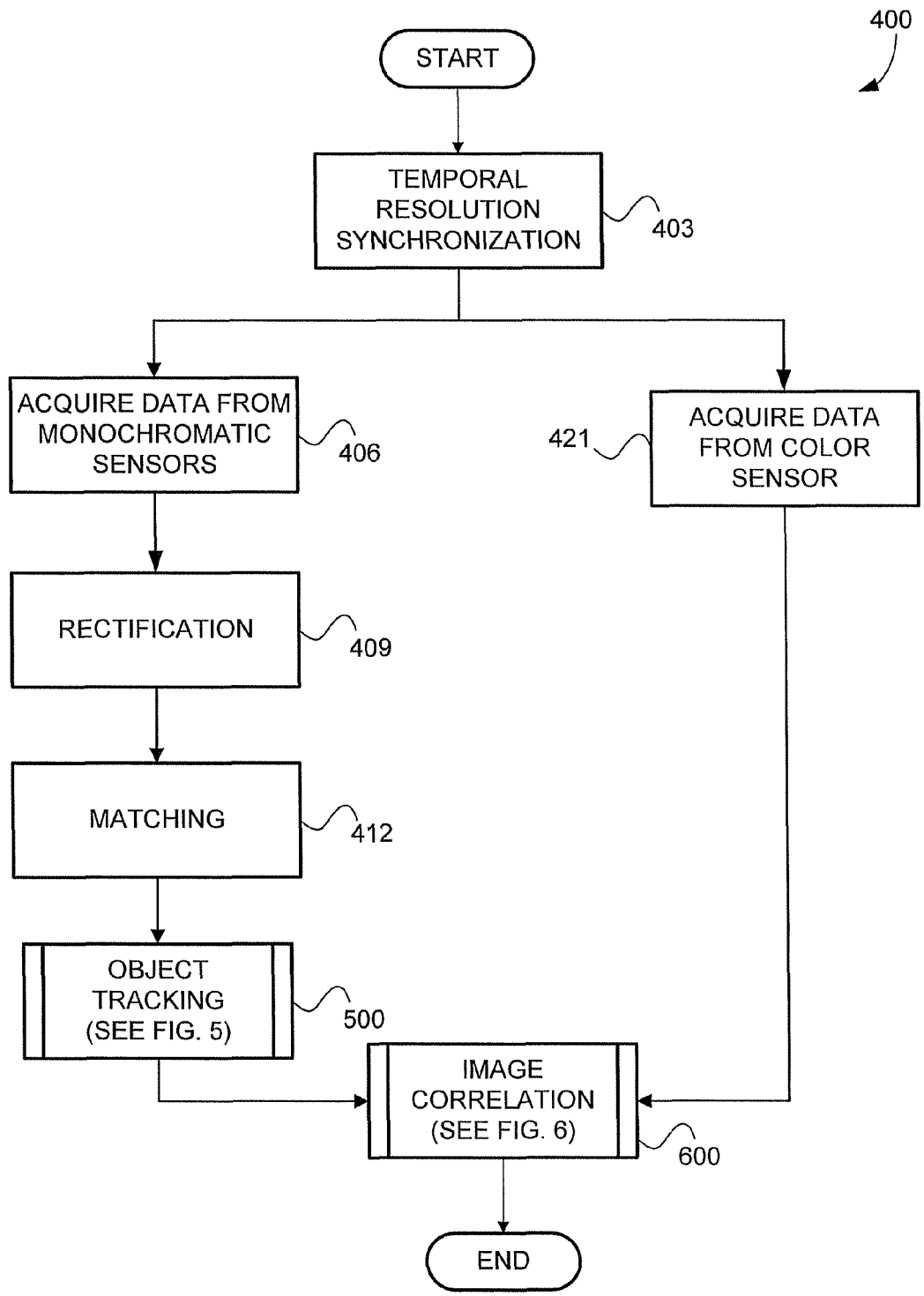
FIG. 4 – EXEMPLARY DATA MERGING PROCESS

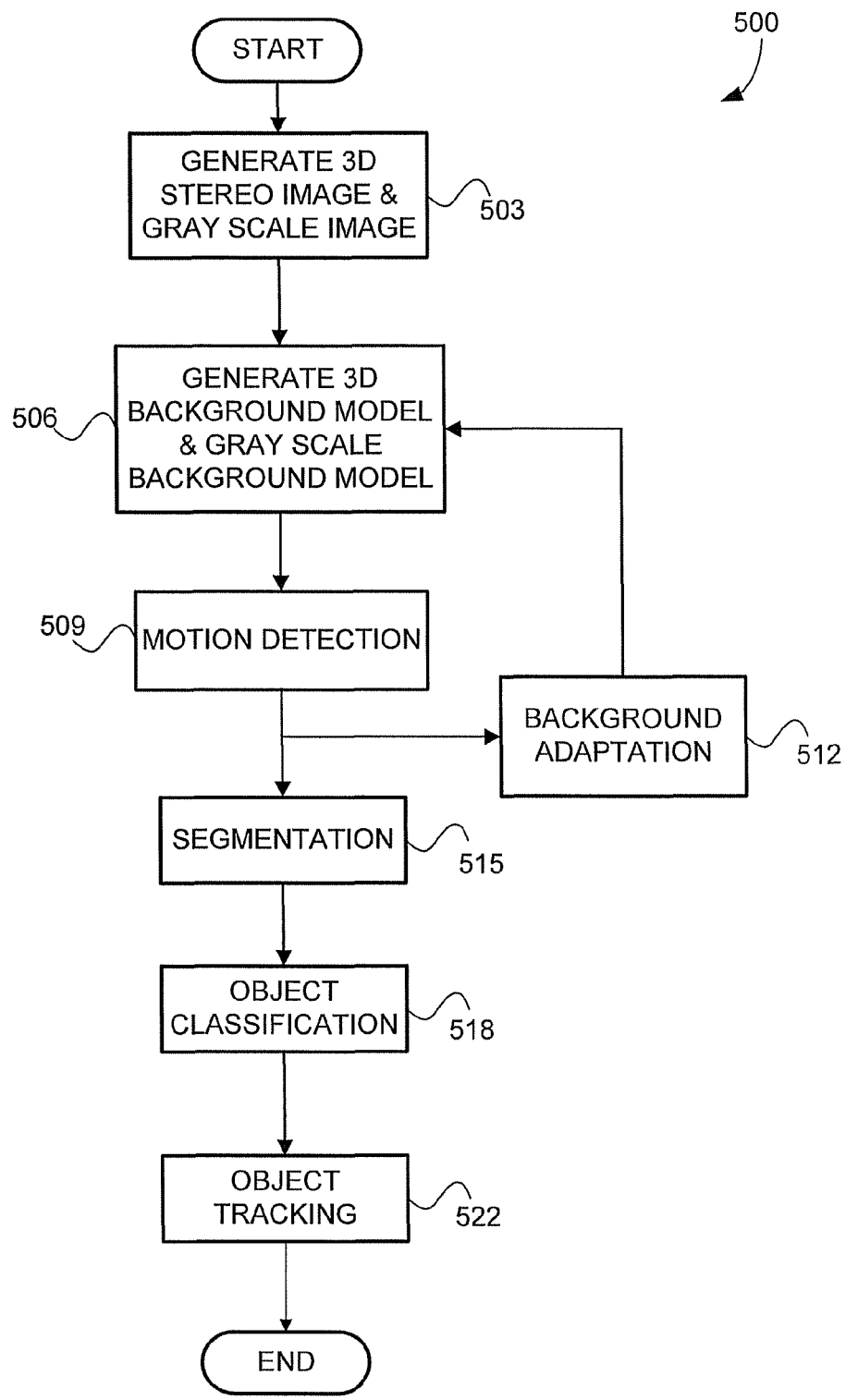
*FIG. 5* – EXEMPLARY OBJECT TRACKING PROCESS

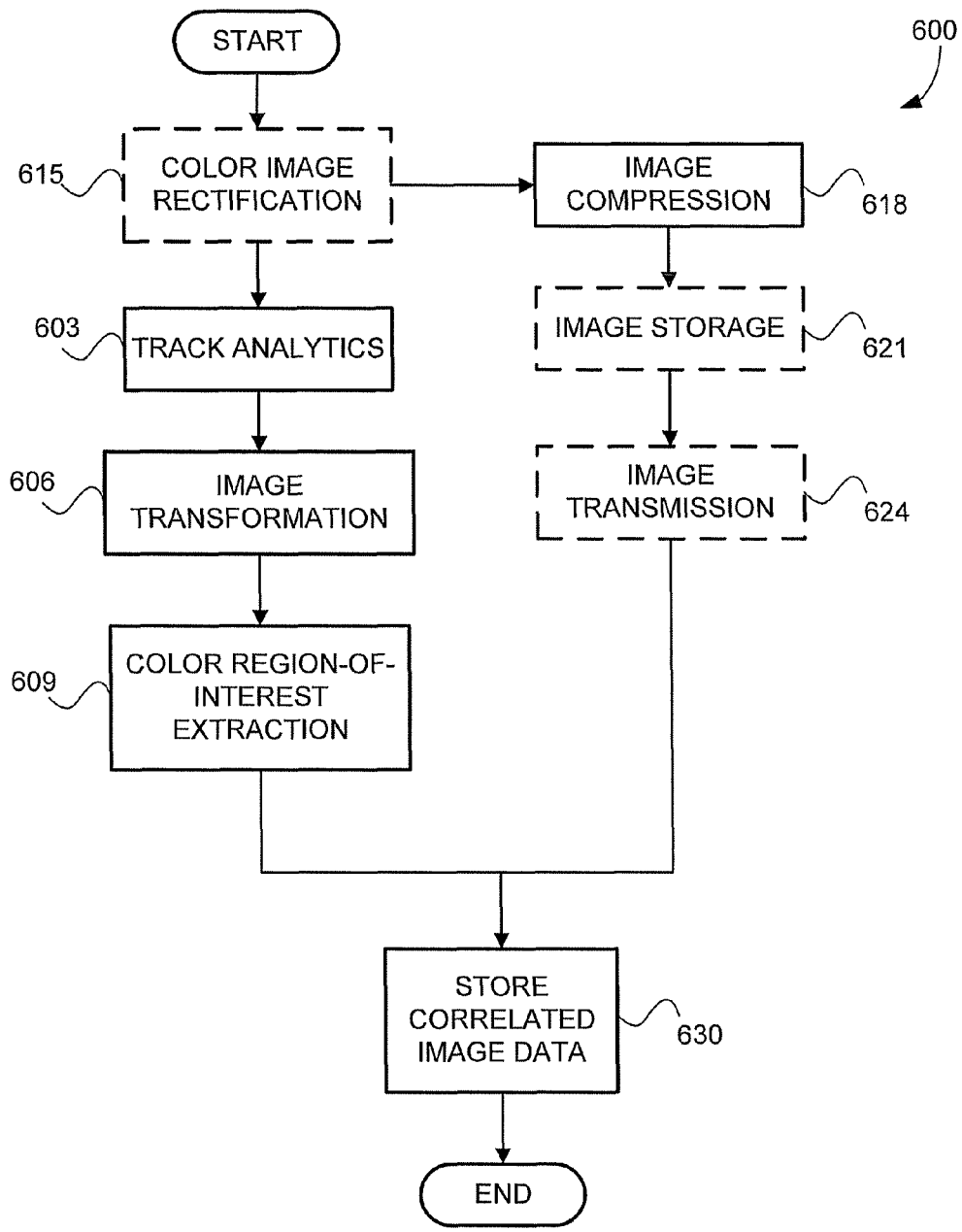
*FIG. 6* – EXEMPLARY IMAGE CORRELATION PROCESS

APPARATUSES AND METHODS FOR DISPARITY-BASED TRACKING AND ANALYSIS OF OBJECTS IN A REGION OF INTEREST

CROSS REFERENCE TO RELATED APPLICATION

This application claims benefit under 35 U.S.C. §119(e) of U.S. Provisional Patent Application No. 61/694,525, filed Aug. 29, 2012, and entitled "Multi-Lens Video Analytics Platform," which is incorporated herein by reference as if set forth herein in its entirety.

TECHNICAL FIELD

The present apparatuses and methods relate generally to multi-sensor devices and associated functionality, and more particularly to multi-sensor or multi-camera devices with embedded software for use in surveillance or security applications.

BACKGROUND

Various types of facilities often incorporate the use of sensors for a variety of purposes. For example, many businesses, government agencies, banks, retail establishments, and the like utilize security or surveillance cameras to record activity at the facilities. Many different types of image sensors presently exist for capturing image data, including high resolution sensors for capturing high definition color images, stereo sensors (e.g., 2-camera disparity-based systems) for capturing three-dimensional and object-tracking data, time-of-flight sensors, structured light sensors, and other types of cameras and image sensors. Further, many other types of sensors can be used, such as thermal sensors, audio sensors, and the like.

Traditionally, each sensor has a specific function and comprises a unitary package. For example, if a given facility desired to capture both high resolution images of its customers, while also capturing thermal image data (e.g., in low-light applications), then at least two separate sensor systems would be necessary, requiring at least two discrete installation and calibration efforts, and producing at least two discrete data outputs. Thus need for a variety of different systems increases the cost and complexity associated with purchasing, installing, and operating such systems.

Further, because these systems are discrete, it is not possible to merge the data outputs from the systems to provide additional and rich data that otherwise would not be available. For example, if a facility desired to utilize a stereo sensor for purposes of object tracking, queue metrics, consumer counting, etc., and also use a high resolution sensor to collect high resolution information about specific objects identified via the stereo sensor images, then the output image streams from both systems would need to be physically (by a person) and painstakingly reviewed and compared to determine any meaningful information about the objects in the images. Accordingly, it would be practically impossible to complete this comparison process, say, thousands of times per day (e.g., identifying high resolution images of a plurality of persons entering or leaving a retail establishment).

Therefore, there is a long-felt but unresolved need for a unified, multi-sensor apparatus that enables capturing of a plurality of types of data within a single unit. There is a further need for a multi-sensor system that includes processing capabilities and functionality for merging and comparing disparate data streams to provide additional information and intelligence not previously available.

BRIEF SUMMARY OF THE DISCLOSURE

Briefly described, and according to one embodiment, aspects of the present disclosure generally relate to multi-sensor apparatuses and methods for using the same. In one embodiment, the present disclosure relates to an integrated multi-lens video platform with integrated software for collecting data from each lens and merging the same into a unified data output. According to one aspect, the present apparatus comprises a single integrated unit comprising two disparity-based stereo image sensors (e.g., cameras) for capturing stereo image data (e.g., relating to three-dimensional images and object-tracking) and a single high resolution sensor (e.g., camera) for capturing high resolution and/or color data. Thus, generally, one aspect of the present platform includes three (3) cameras—two cameras directed to stereo vision capabilities, and a third camera directed to high resolution uses. In other embodiments, other camera configurations, numbers, and arrangements are possible as will occur to one of ordinary skill in the art.

In one particular embodiment, the present multi-sensor devices comprises a suite of smart camera platforms with integrated stereo vision capabilities used for a suite of applications, such as (person) traffic counting, queue measurement, full store tracking, and the like. Smart cameras provide the capability to track people (or other objects) within the view of the camera and then perform a set of track analytics, such as counting, queue length, time in a given area, etc. In one embodiment, an output of the smart camera device comprises an XML data stream sent over various delivery protocols (e.g, HTTP, FTP, SMTP, etc.) that contains both customer behavior metrics and diagnostic information.

Further, in the particular embodiment described, the multi-camera device includes a third, high resolution imager to support high resolution image data. For example, the high resolution imager can support H.264 streaming video (or a similar output) into video management systems (VMS) for security applications. The H.264 encoded color video stream enables video capture to VMS systems, where the video can then be indexed based on analytics performed on the stereo data stream or simply archived for viewed based on other indexing techniques, such as transaction data analysis, access control devices, etc.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary environment in which an embodiment of the present multi-sensor apparatus, including its associated methods and functionalities, is utilized in accordance with the various aspects of the present disclosure.

FIG. 2 is a partially-exploded perspective view of an exemplary embodiment of the multi-sensor device.

FIG. 3 is a schematic view of the electrical hardware of one embodiment of the present multi-sensor device.

FIG. 4 illustrates an exemplary data merging process for merging multiple imaging data streams according to one embodiment of the present disclosure.

FIG. 5 illustrates an exemplary object tracking process performed by one embodiment of the present disclosure.

FIG. 6 illustrates an exemplary image correlation process performed by one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Overview

Aspects of the present disclosure generally relate to multi-sensor apparatuses and methods for using the same. In one embodiment, the present disclosure relates to an integrated multi-lens video platform with integrated software for collecting data from each lens and merging the same into a unified data output. According to one aspect, the present apparatus comprises a single integrated unit comprising two disparity-based stereo image sensors (e.g., cameras) for capturing stereo image data (e.g., relating to three-dimensional images and object-tracking) and a single high resolution sensor (e.g., camera) for capturing high resolution and/or color data. Thus, generally, one aspect of the present platform includes three (3) cameras—two cameras directed to stereo vision capabilities, and a third camera directed to high resolution uses. In other embodiments, other camera configurations, numbers, and arrangements are possible as will occur to one of ordinary skill in the art.

In one particular embodiment, the present multi-sensor devices comprises a suite of smart camera platforms with integrated stereo vision capabilities used for a suite of applications, such as (person) traffic counting, queue measurement, full store tracking, and the like. Smart cameras provide the capability to track people (or other objects) within the view of the camera and then perform a set of track analytics, such as counting, queue length, time in a given area, etc. In one embodiment, an output of the smart camera device comprises an XML data stream sent over various delivery protocols (e.g, HTTP, FTP, SMTP, etc.) that contains both customer behavior metrics and diagnostic information.

Further, in the particular embodiment described, the multi-camera device includes a third, high resolution imager to support high resolution image data. For example, the high resolution imager can support H.264 streaming video (or a similar output) into video management systems (VMS) for security applications. The H.264 encoded color video stream enables video capture to VMS systems, where the video can then be indexed based on analytics performed on the stereo data stream or simply archived for viewed based on other indexing techniques, such as transaction data analysis, access control devices, etc.

In one embodiment, the multi-sensor appliance and related software described in this document is targeted to the retail video analytics market (e.g., counting, queue measurement, etc.), the retail video surveillance market, and many other markets as will occur to one of ordinary skill in the art. For example, some use cases for the multi-sensor platform described in this disclosure include, but are not limited to:

Cashier Surveillance/Integrated Queue Metrics: Cashier surveillance applications typically require color video where the camera view is zoomed over the scan area to capture and or detect "sweet-hearting" or "palming" items as they are scanned across the checkout lane (i.e., fake scanning with product placed in bag or held in a manner so as not to be read by the register). Queue measurement systems require a large field-of-view in order to see the total queue area. Thus, aspects of the present disclosure provide a unitary appliance that enables both sets of functionalities.

In-Store Security/Behavioral Metrics: Typical loss prevention applications support cameras viewing down aisles, entrances, corridors, etc., providing video capture for shoplifting evidence or safety issues. These types of views reduce camera count while still providing adequate video evidence, especially when high resolution images are collected supporting digital zoom. Behavioral metrics may range from basic counting with down looking views to full tracking, requiring oblique views. Given the differences in viewing perspective, image resolution, and field-of-view of the stereo device, traditionally two different camera systems are required. Aspects of the present disclosure accomplish this functionality via one integrated device and set of processing methodologies.

Color/Stereo Data Integration: Opportunities exist in which higher performing products can be supported with the integration of low resolution stereo and high resolution color. Examples are face capture in highly crowded traffic areas, filtering of employees based on behavior and uniform color, etc.

As will be understood and appreciated, a high-level overview with some exemplary use cases has been described above. What follows is a detailed description of various embodiments of the present multi-sensor image apparatus and associated processing software/capabilities.

Exemplary Embodiments

Referring now to the drawings, in which like numerals illustrate like elements throughout several drawing figures, FIG. 1 illustrates an exemplary environment 100 in which an embodiment of the present multi-sensor apparatus 103, including its associated methods and functionalities, is utilized in accordance with the various aspects of the present disclosure. Generally, aspects of the present apparatus 103 include at least two low resolution sensors 115a, 115c (e.g., cameras) for collecting three-dimensional (3D) images, and at least one high resolution sensor 115b for capturing high resolution two-dimensional (2D) images. In many aspects, the device 103 also includes computer processors, memories, software, and other computer-related components for capturing, processing, storing, and transmitting image data captured by the sensors 115. Further details and information relating to the hardware specifics of various embodiments of the multi-sensor apparatus 103 will be described in greater detail in FIGS. 2 and 3.

As shown in FIG. 1, an embodiment of the present apparatus 103 is utilized in an environment 100, such as a pointof-sale transaction terminal in a retail establishment, an automated teller machine (ATM), an entrance to a building or retail establishment, an exit, or any other localized area in which people or objects may move and/or interact with devices, other people, or objects. In one embodiment, an environment 100 (e.g., a transaction terminal) is controlled by an operator 106, such as a retail store employee or cashier, and comprises systems for performing the transactions. For example, in a retail store the transactions involve individuals 109 purchasing different items from the retail store, where the purchase is conducted at the transaction terminal 100. Generally, an individual will hold at least one item for purchase in the hands, on the floor, or contained in a carrying system such as a shopping cart or a basket. An individual 109a may approach the transaction register 112 and place the items for purchase on the receiving end of the transaction terminal 100. The receiving end of the transaction terminal 100 is generally located on the countertop of the transaction terminal 100 furthest from the door access to the facility, and may comprise a conveyor belt for the generally horizontal displacement of items from the receiving end of the transaction terminal 100 to the operator 106a. The operator 106a generally receives the items and proceeds to identify them, generally using a scanner device located at the transition terminal 100 configured to recognize the products available for purchase at the facility. The operator 106a records the transaction and collects the payment of the purchase using a system comprised by the transition terminal 100, such as a transaction register 112. The items for purchase are generally transferred to the collecting end of the transaction terminal 100 and enclosed the in bags or boxes by the operator 106a or an operator assistant 106b, such as another store employee. Finally, the items are generally collected by the individual 109a and retrieved from the facility. In one aspect, several individuals 109 may desire to purchase items at the same time, and therefore a queue or crowd may form at the transaction terminal 100.

As illustrated in FIG. 1, an exemplary embodiment of the device or system 103 of the present disclosure is positioned to view a selected area of interest in the exemplary environment 100 in which the system 103 is utilized, such as a transaction terminal. In one aspect, the device 103 comprises a tracking system (e.g., sensors 115a and 115c, in addition to tracking software) configured to detect and track at least one object, such an individual 109, within a selected area of interest. The selected area of interest may comprise a tracking zone including one or more individuals 109 in a queue during the normal operation of a transaction terminal 100, and may include different parts of the transaction terminal 100, the items involved, and the operators 106 of the transaction terminal 100. In one aspect, the system comprises a camera device 103 positioned above the transaction register 112 or environment 100 and configured to execute the processes required to detect and track at least one individual or object 106, 109 in a queue. In other aspects, the device 103 may be implemented in a variety of physical positions and scenarios to track various objects, as will occur to one of ordinary skill in the art. Generally, the system 103 utilizes one or more sensors 115 (e.g., cameras) to detect and track objects or individuals 106, 109 within a tracking zone and determine the position of an object 106, 109 within the zone. The system 103 may perform additional data processing with the data acquired by the sensor system 115, and the data may also be transmitted to any other system or systems, such as a control unit, server, storage device, etc.

In one aspect, the system 103 comprises two or more monochromatic sensors 115a, 115c which allow the system 103 to product a stereo image and simulate binocular vision, and therefore enables the identification and location of objects within a field of vision of the device 103. In one aspect, the device 103 comprises at least one color sensor 115b with high pixel resolution. In certain embodiments, the device includes logic (e.g., software, processing capability, etc.) to merge the data of the color sensor 115b with the data of the more monochromatic sensors 115a, 115c according to various aspects of the present disclosure.

Still referring to FIG. 1, aspects of the multi-sensor device 103 generally comprise components and functionality for receiving, processing, storing, and/or transmitting video data from different sensors 115. In one aspect, the system 103 may comprise at least two monochromatic sensors 115a, 115c and at least one color sensor 115b. In one aspect, the sensors 115 can have different fields of view, and the sensors may acquire data, images, or video frames from different regions within the environment 100 where the system 103 is deployed. For example, the two monochromatic sensors 115a, 115c can have a wide field of view covering the entire environment 100, and another sensor, such as a high pixel resolution color sensor 115b, may have a narrower field of view to track specific objects 106, 109 or details at the transaction terminal 100. For example, the two monochromatic sensors 115a, 115c may detect, track, and/or analyze all the objects 106, 109 at the transaction terminal, whereas the color sensor 115b may track and analyze specific objects 106, 109, whose selection may be triggered by the results from the detection, tracking and analysis performed by the monochromatic sensors 115a, 115c. In another embodiment, however, the color sensor 115b acts independently from the monochromatic sensors 115a, 115c, and they may or may not have different fields of view.

In various other embodiments of the multi-sensor device 103, other arrangements of components may be employed. For example, certain embodiments of the device 103 may utilize two high resolution color sensors (cameras) instead of a combination of two low resolution stereo sensors 115a, 115c and one high resolution color sensor 115b to capture the desired images and information from the environment 100. In other embodiments, a plurality of sensors can be used, such as thermal sensors to track the temperature of objects within the environment 100, or a large number of cameras. It will be understood by those of ordinary skill in the art that many variations of the device 103 are possible in light of the present disclosure, and no limitation is intended by the specific embodiments presented.

Additionally, according to one embodiment, the image data and associated metadata from the various sensors 115 is merged to create one cohesive data set. For example, the stereo sensors 115a, 115c can be used to identify and track objects within the environment 100. The object tracking data can be merged with the high resolution color data captured from the high resolution sensors 115b to generate a comprehensive data picture of the objects in any given frame captured by the sensors 115. The merged data can be used in a variety of applications, as described in greater detail below.

As will be understood and appreciated by one of ordinary skill in the art, aspects of the present device 103 can be used in a variety of applications. In one aspect, the device 103 comprises a recording device for use in recording and/or analyzing transactions occurring at a transaction terminal 100, such as a point-of-sale terminal. For example, using the present device at a point-of-sale terminal can help prevent "palming," the practice of stealing from a retail establishment by a cashier failing to ring up all items being purchased. In one aspect, the device 103 captures, produces and transmits video data signals representative of the some or all fields of view of the sensors 115 of the system 103, and the video capture device is positioned at a desired position in the transaction terminal 100. In other embodiments, the device 103 is used for security purposes (e.g., at entrances and exits of various buildings), in banking or other high-risk environments, and in other scenarios as will occur to one of ordinary skill in the art.

Turning now to FIG. 2, a perspective view of one embodiment of the present device 103 is shown comprising several sensors 115, electronic components, supporting components, and an enclosure (housing). Generally, the device 103 comprises at least two lenses with separate image sensors 115a, 115c. Generally, the two image sensors 115a, 115c are distally separated from one another and capture two-dimensional images. These generally two-dimensional images are combined and processed in the device 103 to acquire various characteristics of objects 109 in a selected area of interest or tracking area. In one aspect, the processing involved to process the two-dimensional images is a generally complex process and comprises the acquisition of visual information by the sensors 115a, 115c, processing in the device 103 the raw data from the sensors 115a, 115c, and the production of meaningful data that can be used for detection, tracking, and/or analysis of the objects 109 in a selected are of interest. In one embodiment, the two-dimensional images from the sensors 115a, 115c are combined to form 3D image data.

In one aspect, the device 103 comprises a color sensor 115b with high pixel resolution. In one embodiment, the data from the color sensor 115b may be merged with the data from the monochromatic image sensors 115a, 115c to form a complete data set of all image data captured from all sensors. As show in FIG. 2, the sensors 115 are generally positioned inside of the device 103 and attached to the distal end of a supporting structure 209, which is attached at the proximal end to the substrate of the electronic circuitry of the device 103. Generally, the sensors 115 are connected to a processing unit or processor 221, such as en embedded microprocessor, and other electronic components 222 are utilized to enable the device 103 to perform the processing involved in the various aspects of the present disclosure. The electronic components 222 may include a hard drive or flash memory, a random access memory (RAM), external communication ports 218, decupling capacitors, clock sources such as crystal oscillators, networking components such as an Ethernet port, a power delivery system, a wireless module, a universal serial bus (USB) and port, and any other components required to support the processing involved in the various aspects of the present disclosure.

Generally, the components 222 are surface-mount components placed on a printed circuit board (PCB) enclosed by a case 215 and a cover 203 (e.g., housing). In one aspect, the case 215 is a generally hollow, parallelepiped enclosure that hosts the sensors 115, electronic components 222, external communication ports 218, PCB and other components utilized by embodiments of the system 103 of the present disclosure. Generally, the cover 203 can be removed from the device 103 to expose the components of the device, and comprise three openings 206 to allow the sensors 115 to acquire image data from a selected viewing area or areas when the cover 203 is attached to the case 215. The openings 206 in the case are generally circular openings corresponding to the dimensions of the image sensors 115 or the lenses that comprise the image sensors 115. The cover 203 and case 215 may also comprise various openings to accommodate various external connections, ventilation, and any required opening as it will occur to one of ordinary skill in the art. As will be understood and appreciated, however, the components of the device 103 may comprise virtually any type of component that supports the data capture and processing described by the various embodiments of the present disclosure.

The functions of the device 103 are preferably implemented as a software program that may be installed in the device 103 from another memory/storage medium or may be downloaded from an internet site, or from an on-line service for installation into the memory of the system 103. The device 103 generally includes several software programs or modules, each comprising a plurality of executable instructions which, when stored in the memory of the system 103, cause the processor 221 to perform the processes shown and described hereinafter.

FIG. 3 is a schematic view of the electrical hardware 300 of one embodiment of the present multi-sensor device 103. In the embodiment illustrated in FIG. 3, the device 103 generally comprises a high resolution color sensor 115b, and two mono-chromatic sensors 115a, 115b located at opposite sides and generally equidistantly from the color sensor 115b. In one aspect, one or more sensors 115 may be housed in separate sections 315 in the system, and interfaced with the rest of the system 103 via internal connections 318, such as digital or analog busses or connectors. In one aspect, the sections in the system 103 may comprise the supporting structure and components required to enable normal operation of the sensors 115. In one aspect, the system 103 comprises a flash memory 306 for the storage of computer code, data, and any other required processes for allowing normal operation of the system 103. The device 103 also generally comprises a RAM 309 for executing computer programs relating to the normal operation of the system, and for supporting the system 103 as will occur to one of ordinary skill in the art.

In one aspect, the device 103 comprises an embedded microprocessor 303 for data processing as well as controlling the operation of the system 103. Generally, the embedded microprocessor 303 comprises a plurality of digital and analog ports for interfacing with the different components of the system 103. In one aspect, the microprocessor 303 controls the sensors 115, commands the sensors to capture data, processes the data, and provides an output in accordance with various aspects in the present disclosure. In one aspect, the embedded microprocessor comprises a system-on-chip as well as a digital signal processing (DSP) architecture, peripherals for interfacing with the different components in the system 103, peripherals for networking, booting and encryption, and may run an operating system.

Generally, the system 103 is programed via external connections 312 to perform various aspects of the present disclosure, and any resulting software programs are generally stored in the flash memory 306. During operation, the device 103 retrieves any computer code required to perform a specific task from the flash memory 306, and transfers the computer code to the RAM 309, where it can be executed more efficiently. In one aspect, the microprocessor 303 commands the sensors 115 to acquire data from a selected viewing area, processes the data from the different sensors 115, and outputs meaningful results according to the various embodiments of the present disclosure. The system 103 may also comprise ports of power delivery, programing, data transfer, networking and any other component as required by the processes described by the various embodiments of the present disclosure. The system 103 can include other types of memory, such as a read-only memory (ROM), component electronically programmable read-only memory (EPROM), erasable electronically programmable read-only memory (EEPROM), other flash memory, Secure Digital (SD) Card, as well as other suitable forms of memory.

Still referring to FIG. 3, in one embodiment, the processor 303 can optionally use the one or more processing units. Additionally, or alternatively, a processing unit can be a separate component within the processor 303 system, and can communicate with the other components of the processor 303 via a bus or other suitable connection. Further, other I/O components or external communication ports 218, 318 can include a variety of suitable connection interfaces, such as wired connections, standard serial ports, parallel ports, S-video ports, large area network (LAN) ports, small computer system interface (SCSI) ports, or other suitable wired connections. Additionally, the other I/O components or external communication ports 318 can include, for example, wireless connections, such as infrared ports, optical ports, Bluetooth wireless ports, wireless LAN ports, ultra-wide band (UWB) wireless ports, among others as will occur to one of ordinary skill in the art.

Generally, sensors 115 are manufactured with inherent physical differences that vary from sensor to sensor, and therefore data merging across various sensors requires calibration, which refers to mathematically compensating for differences across different sensors 115. Furthermore, traditionally, image sensors on different substrates or enclosures are very challenging to calibrate during deployment, such as the deployment at a retail store. Moreover, the image sensors on different substrates or enclosures can shift, and even a minimal offset would render data merging methods highly unreliable and rather unpredictable. In one embodiment of the present disclosure, however, the color sensor 115$b$ and monochromatic sensors 115$a$, 115$c$ are comprised within the same enclosure and are embedded on a common substrate or mounting surface. As compared to traditional systems in which maintaining reliable long-term calibration of the sensors 115 is virtually impossible or very costly, the complexity of calibration is dramatically reduced by the present device 103 by geometrically arranging the sensors 115 on the same mounting surface within the same enclosure in accordance with the methods described in various embodiments of the present disclosure (as described in greater detail below).

In one aspect, the sensors 115 can be calibrated before deployment, such as at the manufacturing facility. Therefore, the multi-sensor device 103 is able to maintain reliable long-term calibration even if the system 103 is shifted or moved. Furthermore, calibration before deployment relieves the complexity of implementation and installation of embodiments of the device 103 as compared with traditional systems. For example, an installation crew at a retail store will not be required to calibrate multiple devices with respect to each other as is required by traditional systems and devices. This calibration feature is beneficial in terms of practical deployment purposes in the sense that often unskilled persons are asked to install image sensing devices. In one aspect, the sensor calibration of the present system 103 is performed before deployment at a location using well known calibration methods such as the ones described by the camera calibration and 3D reconstruction functions in the Open Source Computer Vision Library (OpenCV). Further information relating to OpenCV can be obtained at the following website: http://opencv.org.

In one aspect, the presently-described calibration methods produce a set of calibration parameters that describe the results of the calibration method, which are used to reliably merge data across a plurality of sensors (including different sensor types). The calibration parameters are generally different for every system 103 of the present disclosure due to the intrinsic physical differences among image sensors. Therefore, in one aspect, each device 103 manufactured is calibrated at a facility before deployment, such as the manufacturing facility, and the calibration parameters are stored in the non-volatile memory of the device 103 or suitable storage element in the device. During normal operation of the system 103, the microprocessor 303 can generally access the calibration parameters and use them to reliably merge data across the different image sensors 115 (described in greater detail below).

As will be understood by one of ordinary skill in the art, the hardware and specific circuitry of embodiments of the device 103 can vary according to aspects of the present disclosure. Accordingly, although examples of the hardware associated with the device 103 have been previously described, it is not intended that the present disclosure be limited to the specific embodiments or aspects presented, and other variations of the device 103 will be apparent to one of ordinary skill in the art.

Turning now to the processes, methods, and other functionalities performed by the software, modules, algorithms, and other components of the present device, FIG. 4 illustrates an exemplary data merging process 400 for merging multiple imaging data streams according to one embodiment of the present disclosure. In particular, it is beneficial in certain applications to be able to map data outputs from one sensor (or combination of sensors) to other sensors within the device 103 to generate a unified or associated data output. For example, it may be beneficial to map objects and related metadata identified in various images via a pair of stereo lenses to corresponding images or frames captured via a high resolution sensor. Merging or comparing these data streams, however, is computationally and practically challenging. Aspects of the present disclosure are aimed at overcoming these challenges, as described in greater detail herein.

Referring to FIG. 4, an exemplary process is shown for merging data outputs/streams from a pair of stereo image sensors and a high resolution color image sensor. As will be understood, the steps of the process 400 shown in FIG. 4 (and other processes shown and described in this disclosure) are not necessarily completed in the order shown, and various processes of embodiments of the present disclosure may operate concurrently and continuously. Accordingly, the steps shown in FIG. 4 (and in other figures, such as FIG. 5 and FIG. 6) are generally asynchronous and independent, computer-implemented, tied to particular machines, and not necessarily performed in the order shown.

In one embodiment of the present device 103, the stereo image sensors 115$a$, 115$c$ generally have a higher temporal resolution than the high resolution color sensor 115$b$, and the color sensor 115$b$ generally has a higher pixel resolution than the image sensors 115$a$, 115$c$. Therefore, in one embodiment illustrated in FIG. 4, the system 103 generally synchronizes, via step 403, the temporal resolution of the sensors 115, preferably to a 2:1 ratio, although various ratios may be utilized as will occur to one of ordinary skill in the art. Generally, the frame rates (frames/second) of the respective sensors should be multiples of each other. For example, if the frame rate of the stereo sensors is 30 f/s, then the high resolution sensor should be 15 f/s, or 6 f/s, or 5 f/s, etc.

In traditional systems, in which sensors are housed in discrete systems and controlled by separate processing systems, temporal synchronization is very challenging and impractical. For example, two different systems are generally not controlled by the same microcontroller, and therefore will not run under the same clock. Aspects of the present device 103, however, generally utilize a single controller or microprocessor 303, such as a crystal oscillator to a central processing unit (CPU), thereby enabling common control and management of the sensors. If the systems are not controlled by the same microprocessor, any processing will be greatly limited, especially during real-time data processing. For example, if the imaging systems are not controlled by the same microprocessor, any system-level interrupts required by the algorithms implemented for the processing of the data acquired across a plurality of sensors cannot adequately function. There would also a delay in the transfer of data from one system to the other, and challenges in creating that communication interface between two or more separate systems, and managing the communication interface during the deployment and during normal operation of the systems.

Further, although the frequency of the clock in a microprocessor is generally several orders of magnitude faster than the frequency of data capture of image sensors, some imaging systems benefit from sharing the same clock as described in one aspect of the present disclosure. For example, a system recording objects at a very high speed, such as a high-speed camera, would deteriorate in terms of data merging across a plurality of sensors running on different clocks as the frequency of the data capture approaches the frequency of the CPU clock. In one aspect of the system 103 of the present disclosure, however, the sensors 115 are generally controlled by a single microprocessor with a single CPU clock at the given time window. This single-enclosure/single-substrate and single-microprocessor arrangement eases implementation issues, reduces costs in development of the systems, and reduces challenges and costs involved in the deployment and operation of the systems as compared to traditional systems.

In one embodiment, after the temporal resolution of the sensors 115 is synchronized 403 (e.g., on a frame by frame basis), the system 103 acquires or receives data, at step 406, from the monochromatic image sensors 115a, 115c, and also acquires data, at step 421, from color sensor 115b. In one embodiment, the receipt or acquisition of data from the sensors is continuously ongoing and running in parallel. In other embodiments, data is only received or acquired based on the triggering of an event. For example, if an object is identified in the monochromatic image data (via object tracking process 500), then an event can be triggered such that the high resolution sensor will begin capturing data and providing it to the device processor 303 via step 421. As will be understood, other embodiments of the data acquisition steps will occur to one of ordinary skill in the art.

Further, in one embodiment, because the images, data, and frames being acquired from the sensors are temporally synchronized, each time-delimited collection of frames may include varying numbers of images. For example, in a scenario in which the stereo sensors 115a, 115c are running at 30 f/s, the high resolution sensor is running at 15 f/s, a sample of frames at given times may appear as follows (where t=time identifier, LS=left stereo image, RS=right stereo image, and HR=high resolution image):

t1=LS, RS
t2=LS, RS, HR
t3=LS, RS
t4=LS, RS, HR

As shown above, because the frame rate for the stereo images is twice that of the high resolution image, for each time indicator the HR frames will alternate. As will be understood, this is but one example of the time-based synchronization of images and data.

Generally, after the images from the sensors have been acquired at step 406, rectification (step 409) and matching (step 412) of the data captured by the monochromatic image sensors 115a, 115c is performed. During rectification, the system 103 generally utilizes the calibration parameters previously described and computes the relationship between the image frames captured by the different monochromatic image sensors 115a, 115c. Generally, the rectification step 409 utilizes the calibration parameters of the monochromatic image sensors 115a, 115c and computes the transformations of the images captured by the image sensors 115a, 115c as a means to position the images on the same plane. This rectification steps generally attempts to solve the correspondence problem, which refers to the problem of ascertaining which parts or fields of one image captured by one monochromatic image sensors 115a correspond to similar parts or fields of the image captured by the other monochromatic image sensor 115c. Image rectification is generally known by those of skill in the art.

In one aspect, after the images or data captured by the monochromatic sensors 115a, 115c has been rectified at step 409, the matching step 412 is performed. The matching process generally comprises generating or calculating a disparity map, which refers to the difference in image location of an object identified and captured by the two monochromatic image sensors 115a, 115c resulting from the physical distal separation of the two monochromatic image sensors 115a, 115c. The system 103 generally uses the disparity map to extract depth information from the two-dimensional monochromatic images or data captured by the monochromatic image sensors 115a, 115c. Therefore, the difference in coordinates of similar features within the two images captured by the two monochromatic image sensors 115a, 115c may be generally calculated by the system 103 of the present disclosure. Generating a disparity map for two images is generally known in the art. For example, calculating the disparity map and rectifying the images are demonstrated in camera calibration and 3D reconstruction functions in OpenCV (discussed previously).

Generally, the output of the matching step is a left rectified image (from the left monochromatic image sensor), a right rectified image (from the right monochromatic image sensor), and a disparity map. In certain embodiments, the corresponding high resolution image (acquired via step 421) is also rectified and associated with the output of the matching step with respect to the monochromatic images (see optional step 615 in process 600, discussed below). In one embodiment, the left rectified image and right rectified image may comprise different resolutions, and the high resolution rectified image may be different from the other images.

In one aspect, after the matching step 412 has been performed, methods for identifying and tracking at least one object, such as a person, in a video frame created by merging the data from the two monochromatic image sensors 115a, 115c are performed by the device 103 via object tracking process 500. Generally, the outcome of the object tracking process 500 is a collection of metadata relating to the images and objects identified in those images. Certain earlier patents owned by the assignee of the present disclosure describe methodologies for conducting object tracking in images. For example, U.S. Pat. No. 6,185,314, entitled "System and Method for Matching Image Information to Object Model Information," describes a system for evaluating whether image information for a region of a video frame of a particular area of interest represents an object to be tracked; U.S. Pat. No. 6,141,433, entitled "System and Method for Segmenting Image Regions from a Scene Likely to Represent a Particular Object in the Scene," describes a method for extracting image information from a video frame, where the image information is believed to belong to an object to be tracked; U.S. Pat. No. 6,263,088, entitled "System and Method for Tracking Movement of Objects in a Scene," describes a method for tracking movement of objects, such as people, through a particular area of interest; and U.S. Pat. No. 6,295,367, entitled "System and Method for Tracking Movement of Objects in a Scene Using Correspondence Graphs," describes a method for determining and tracking the movement of objects, including splits and merges of objects in a particular area of interest. Each of U.S. Pat. Nos. 6,185,314, 6,141,433, 6,263,088, and 6,295,367 (described above) are hereby incorporated by reference as if set forth herein in their entireties.

Generally, aspects of the system 103 are programmable and customizable, and a variety of identification and tracking methods can be utilized by the system of the present disclosure. Further, in one aspect, metadata about the characteristics and behavior of the objects that have been identified and tracked in a particular area of interest are extracted (via the object tracking process 500). Then, the system 103 acquires data, at step 421, from the color sensor 115*b* and merges and processes the data captured by the color sensor 115*b* with the metadata about the objects being identified and tracked in a particular area of interest (via image correlation process 600). In this way, the metadata associated with time-delimited stereo images can be associated with corresponding images, time stamps, image regions, and the like in high resolution images (captured at step 421). Further details of the object tracking process 500 and image correlation process 600 will be described in greater detail below.

FIG. 5 illustrates an exemplary embodiment of the object tracking process 500 performed by the system 103 of the present disclosure. Generally, the system 103 of the present disclosure generates, at step 503, a 3D stereo image of an area of interest, a gray scale image of an area of interest, and also generates (via step 506) a 3D background model and a grey scale background model of an area of interest. The 3D stereo image and the 3D background model generally comprise data created by rectifying and matching the data captured by the image sensors 115*a*, 115*c*. Generally, the 3D background model represents the features in an area of interest that belong to the area of interest (i.e., a stationary portion of the image), and are generally not objects to be tracked. In one aspect, the 3D background model is an image created by rectifying and merging the data captured by the image sensors 115*a*, 115*c* when there are no objects in the area of interest, and the features in the area of interest are generally static. For example, the 3D background model could be a 3D image created by rectifying and merging the data captured by the image sensors 115*a*, 115*c* of a point-of-sale register in a retail store where neither the operators 106 nor the customers 109 are present.

In one aspect, a 3D stereo image generally comprises data created by rectifying and matching the data captured by the image sensors 115*a*, 115*c* during normal operation of an environment in an area of interest. For example, a 3D stereo image can be generated at a point-of-sale register at a retail store when both the operators 106 of the transaction terminal and the customers 109 are actively engaged in purchasing items at the retail store. Additionally, the system 103 of the present disclosure typically generates a greyscale image (via step 503) and a grayscale background model (via step 506) for additional use during the object tracking process 500.

In one aspect, the system 103 generally uses the differences between the 3D background model and the 3D stereo image to identify potential objects to be tracked in an area of interest. For example, people moving through a scene tend to have different attributes than the background. These differences between the 3D background model and the 3D stereo image can be used to identify a potential object to be tracked and perform motion detection (step 509). Generally, object identification and motion detection can be enhanced by the greyscale images and a grayscale background model generated by the system 103. For example, for each image frame generated by the device 103, an image difference between the 3D background model and the 3D stereo image is computed. Since objects to be tracked in an area of interest generally exhibit a different set of grayscale intensities than the background, new objects in an area of interest can be detected by comparing the grayscale intensities in the grayscale image and the grayscale background model generated by the system 103. Further, methods for motion detection and tracking generally rely on finding similarities and differences among contiguous image frames captured by image sensors. For example, color matching is the concept that the color of individual regions where an object to be tracked is located generally does not substantially change from one image frame to the next. Therefore, an acceptable method of matching regions between frames involves detecting similarities in color between regions in two or more different frames. Since objects to be tracked in an area of interest generally exhibit a different set of grayscale intensities than the background, detecting similarities between regions in two or more different frames is enhanced by detecting similarities in grayscale intensities across the grayscale image and the grayscale background model generated by the system 103.

Over time, the region of interest or scene that is being viewed by the system 103 can change. These changes may result from changes in lighting conditions or changes in the physical location of objects within the system view, etc. In order to accurately detect objects within the view of the apparatus 103, the apparatus should be capable of adapting its background to incorporate changes in the scene or area of interest. In a queue at a retail store, for example, the background should generally be updated over time to reflect scene changes in the real world, which may result from lighting condition changes, adding or removing of background objects, physical changes in the background environment, etc. Therefore, reliable object identification and tracking generally relies on background adaptation (step 512), which comprises updating the 3D background model and grayscale background model in the system with changes to the background of an area of interest.

In one aspect, the background adaptation step 512 in may be performed by methods know in the art, such as those described by U.S. Pat. No. 6,061,088, entitled "System and Method for Multi-Resolution Background Adaptation," which is hereby incorporated by reference herein in its entirety. As described in U.S. Pat. No. 6,061,088, the background adaptation process may be implemented in the system 103 of the present disclosure by utilizing the 3D stereo image and grayscale image generated by the system to update the 3D background model and the grayscale background model. The background adaptation generally utilizes the results of the motion detection step (509) and updates the 3D background model and the grayscale background model accordingly. Thus, the newly updated 3D background model and the grayscale background model are then used to perform subsequent motion detection 509.

Still referring to FIG. 5, in one aspect, once the motion detection step has been performed, the system 103 performs a segmentation step (via step 515) for extracting image information from an image or video frame for regions of an image or video frame likely to represent objects of interest in a scene, such as objects to be tracked. Generally, the segmentation step may be performed by methods know in the art, such as the ones described by U.S. Pat. No. 6,195,121, entitled "System and Method for Detecting and Analyzing a Queue," or U.S. Pat. No. 6,141,433, entitled "System and Method for Segmenting Image Regions from a Scene Likely to Represent Particular Objects in the Scene," both of which are hereby incorporated by reference herein in their entireties.

In one aspect, an initial region set is generated by comparing luminance image information and color image information of a video frame with luminance image information and color image information of a background image for the area of interest being analyzed. A secondary region set is generated comprising regions from the initial region set, based upon edge information of the regions and edge information in the background image. A final region set is generated by combining one or more regions in the secondary confidence region set, if such combinations satisfy predetermined criteria, including size, region proximity and morphological features, among others.

In one aspect, once the segmentation process 515 is complete, an object classification process 518 is performed. Generally, the output of the segmentation process 515 is a set of regions likely to represent objects to be tracked, such as a person, item being purchased by a person, vehicle, animal, or any other relevant object. In one aspect, the object classification method can be performed using methods know in the art, such as the one described by U.S. Pat. No. 6,185,314, entitled "System and Method for Matching Image Information to Object Model Information," which is hereby incorporated by reference in its entirety. In one aspect, the object classification process 518 examines image information from regions, such as the regions formed during the segmentation process 515, and determines which regions have a high likelihood of including or comprising an object to be tracked, such as a person. These methods can be implemented in the system 103 to detect any type of object. As will be understood and appreciated, the motion detection step 509, background adaptation step 512, segmentation step 515 and object classification step 518 may be accomplished using a variety of methods, and the system 103 of the present disclosure is fully configurable to accommodate and implement various methods as will occur to one of ordinary skill in the art.

Still referring to FIG. 5, in one aspect, once the object classification step 518 is complete, object tracking 522 is performed. In one aspect, the object tracking 522 may be performed using methods know in the art, such as those described by U.S. Pat. No. 6,263,088, entitled "System and Method for Tracking Movement of Objects in a Scene," or U.S. Pat. No. 6,295,367, entitled "System and Method for Tracking Movement of Objects in a Scene Using Correspondence Graphs," both of which are hereby incorporated by reference in their entireties. Due to the disparity-based nature of one embodiment of the apparatus 103 of the present disclosure, which is inherently binocular, and the methods known in the art, the real-world location of an object can be generally calculated. In one aspect, once the objects have been identified and classified, a correspondence is determined between regions of interest that represent objects in consecutive video frames captured by the system. The movement of objects, referred to as tracks, through the scene or area of interest over time are constructed based upon the correspondence determined between the regions of interest that represent objects in consecutive images or video frames. The movement of objects, such as people, can be tracked through a scene or area of interest because the real-world location at a given instant of time can by calculated by the system 103.

In one aspect, the system 103 assigns a unique object ID to each object identified, and also leverages methods known to one of ordinary skill in the art to identify and calculate metadata relating to the object, such as the location in real-world space of the object (e.g., coordinates x,y from an overhead view), location in the image space (left rectified image, right rectified image, high resolution rectified image), the real-world height, width, size, mass, velocity, acceleration, trajectory, movement, etc. Generally, this metadata relates to the physical features of an object, but may also relate to other non-physical features, such as the time of capture of the image, a retail location identified for an image, etc. Further, the metadata may include time-based or persistence-based metadata, such as the persistence time of an object within an image, the exit or entry time of an object within an image, etc.

Referring now to FIG. 6, an exemplary image correlation process 600 is shown according to one embodiment of the present system 103. Generally, aspects of the image correlation process 600 involve processing of previously-acquired or previously-captured images and subsequently associating the data corresponding to those images together. In particular and in one embodiment in which monochromatic images are captured from stereo sensors 115a, 115c and high resolution images are captured from high resolution sensor 115b, the data associated with those images is processed and associated together to enable downstream analysis, searching, indexing, and the like. For example, the monochromatic images and high resolution images can be first time-correlated such that each specific time indicator includes associated frames from one or more of the sensors. Next, after the images have been time-correlated, the metadata collected and generated from the monochromatic images can be associated with the corresponding time-correlated high resolution images. Further, the metadata can be mapped to specific images in the high resolution image. For example, if a particular object is identified at specific coordinates in the monochromatic images (or frames), then the same object can be mapped and associated with corresponding coordinates in the high resolution image (frame). As will be understood and appreciated, this frame and data association amongst a plurality of time-correlated frames/images enables a variety of benefits, including improved indexing and searching (e.g., of high resolution images), trigger- or event-based high resolution image capture, and many others.

Referring specifically to FIG. 6, the data acquired by the color sensor 115b in the apparatus 103 is optionally rectified (at step 615), optionally stored (locally) at step 621, and then transmitted (at step 624) to some external database, server, or the like. Generally, the color image rectification step 615 utilizes the calibration parameters of color sensor 115b and the monochromatic image sensors 115a, 115c to compute the transformation of the images captured by the color sensors 115b as a means to position all the images generated by all the sensors 115 on the same plane. This color image rectification 615 generally attempts to solve a correspondence problem, which refers to the problem of ascertaining the correlation between specific parts of one image captured by the monochromatic image sensors 115a, 115c and specific correlating parts of the image captured by the color sensor 115b. Generally, after color image rectification, the images captured by the color sensor 115b and the monochromatic image sensors 115a, 115c are mapped to the same plane, as described in methods known in the art (e.g. functions in OpenCV, discussed above).

At this point, the image captured by the high resolution sensor 115b often has a high pixel resolution (generally higher than the pixel resolution of the images captured by the monochromatic sensors 115a, 115c). In one aspect, the high resolution images or video frames acquired or captured by the color sensor 115b are compressed and stored in the system 103 (steps 618 and 621). For example, H.264 image compression can be applied to the images or video frames captured by the color sensor 115b, and the compressed images or video frames may be stored in a memory system, such as an SD card, hard drive, flash drive, or the like. Further, in one aspect, the compressed images or video frames acquired or captured by the color sensor 115b are streamed generally via the external or networking ports 218 of the system 103. For example, the system 103 may implement the Real Time Streaming Protocol (RTSP) for media stream delivery to a video management server in a Local Area Network (LAN).

As shown in FIG. 6, the object tracking step (522, shown in FIG. 5) and the metadata generated by object tracking is used to perform track analytics 603. Track analytics 603 in the system 103 may be performed by methods know in the art, such as the ones described by U.S. Pat. No. 6,195,121, entitled "System and Method for Detecting and Analyzing a Queue," which is hereby incorporated by reference herein in its entirety. During the track analytics step 603, the output represents higher level correspondences calculated from the object metadata obtained during object tracking. For example, the system 103 in a retail store environment 100 may generate data corresponding to the number of people waiting at a point-of-sale register at any point in time, the amount of time the people have waited, in addition to many other types of information relating to the queue. In one aspect, the information related to the objects and the queue is comprised of two different types of metadata, such as the ones described by U.S. Pat. No. 7,319,479, entitled "System and Method for Multi-Camera Linking and Analysis," which is hereby incorporated by reference herein in its entirety.

In one aspect, track analytics 603 provides metadata referred to as track metadata, where the data corresponds to the objects independent of the scene to which they belong. For example, track metadata may comprise the location, activity, and the behavior of an object, among others. Further, in one embodiment, track analytics 603 provides metadata referred to as scene metadata, where the data corresponds to the objects based on the scene to which they belong. For example, scene metadata may comprise the number of an object in a queue, the time an object has spent in a queue, the behavior of the object in the queue, etc.

Still referring to FIG. 6, in one embodiment, the uncompressed data, images, or video frames captured or acquired by the high resolution sensor are also used (in conjunction with the images and metadata captured from the monochromatic sensors) in the track analytics process 603. In one aspect of the present disclosure, color information is added to the metadata representing objects in an area of interest, and can include object metadata, track metadata, and scene metadata. In this way, the high resolution images are associated with the corresponding stereo images and metadata.

In one aspect, the metadata and images previously obtained by merging and processing the images captured by the monochromatic sensors 115a, 115c can be transformed to higher pixel resolution (step 606). In that aspect, an image transformation 606 process is performed, where the pixel resolution of the images captured by the monochromatic sensors 115a, 115c is substantially enhanced by merging the color sensor 115b data with the monochromatic sensor 115a, 115c data. For example, after rectification of the monochromatic images 409 and color image rectification 615 has been performed (i.e., the correspondence problem has been solved and the images captured by the sensors 115 are mapped to the same plane or the disparities among the same object in different images captured by different sensors 115 are known), an object of interest is identified in both the 3D image created by the monochromatic sensors 115a, 115c and the image created by the color sensor 115b. Then, the object in the image created by the high pixel resolution of the color sensor 115b is extracted and associated with the object of the image created by the monochromatic sensors 115a, 115c based on correspondence parameters, such as real-world location, location in an image, size, luminance, etc.

In one aspect, the correspondences between objects in both the images generated by the monochromatic sensors 115a, 115c and the images generated by the color sensor 115b are temporal or spatial conditions representative of the objects being tracked. For example, these correspondences can be the physical properties of the objects such as size and location, as well as their movement through an area of interest. In another aspect, the overall pixel resolution of images captured by the monochromatic sensors 115a, 115c can be enhanced by merging the images captured by the color sensor 115b. For example, if the sizes of the images are known, and the viewing area of the monochromatic sensors 115a, 115c and the color sensor 115b are known, a combined image can be generated where the high pixel resolution image generated by the color sensor 115b digitally intersects the image generated by the monochromatic image sensors 115a, 115c. In alternate embodiments, an association is created in a database between the monochromatic frames (and corresponding metadata) and corresponding high resolution frames. Regardless of the approach, in one aspect, every pixel in a 3D image generated by the monochromatic sensors 115a, 115c has a corresponding group of color pixels obtained by the color sensor 115b.

Traditional systems, however, are generally incapable of performing an image transformation 606 of this type; especially in real-time systems because calibrating and coordinating such a complex process is traditionally highly technically challenging, impractical, and/or very expensive. In one aspect of the system 103 of the present disclosure, however, the system 103 coordinates and performs such a complex process like image transformation 606 due to the inherent physical arrangement of the sensors 115, containing suitable components and architecture generally in one single enclosure and generally controlled by a single agent (e.g. microprocessor), operating the sensors in a time-correlated manner (e.g., at the same or corresponding frame rates on an identical clock), and other methodologies as described herein.

Still referring to FIG. 6, after the image transformation 606 is completed, a process referred to as color region-of-interest extraction 609 may be performed, and generally results in a high resolution image of an object of interest 612 in the viewing area of the system 103. For example, the high resolution image of an object of interest may be the face of a person, a snapshot of the crowd, a full snapshot of an object, a snapshot of the queue, and any other high pixel resolution image that could be of interest in a particular application of the system 103 of the present disclosure. In one aspect, the color region-of-interest extraction 609 may be triggered by a predetermined temporal and/or spatial condition (or trigger/event). For example, the tracking information obtained during object tracking 522 and track analytics 603 is useful to determine when a predetermined temporal and/or spatial condition occurs in an area of interest, and generating an indication, such as a triggering signal. The predetermined temporal and/or spatial condition may be many types of conditions, such as the entry of an object (person) into a particular portion of a scene, a detected anomaly in the scene, a long time period with no activity, and many other types of events.

In one exemplary embodiment, and assuming the data across different sensors 115 in the system 103 has been rectified, a high resolution image of an object (e.g., the face of a person for identification purposes) can be generated by extracting the region corresponding to the object in the high pixel resolution color image generated by the color sensor 115b, when it has been determined by disparity-based analysis on the images captured by the monochromatic sensors 115a, 115b that the object is within a certain distance from the system 103. In this exemplary embodiment: (1) the system 103 can acquire the high resolution image when the person (or object) is within a certain distance of the system 103, where the pixel resolution of an image captured at that distance may comply with standards in surveillance systems for identification purposes; and (2) by only acquiring a high resolution image of the face of the person once, storage requirements of a surveillance system are greatly diminished.

In traditional systems, however, high resolution data is captured for a large area, and generally compressed and stored. These traditional approaches add cost and complexity due to the large memory storage requirements, and also add inefficiency if the footage were to be reviewed. In the case of a scam (e.g., "sweet-hearting") at a retail store, for example, security personnel would have to review low resolution footage of the subjects at the point-of-sale terminal. Using the system 103 of the present disclosure, however, security personnel could easily search for and review a high resolution image of each of the customers who used the point-of-sale register where the scam occurred, along with metadata associated with their activity, behavior, time spent at the register, interactions with other objects, etc. In another example, the color region-of-interest extraction 609 may be triggered by the passage of a hand through a scanning region of a scanner at a point-of sale register which scans items at a retail store. In addition, the condition detected may be a predetermined length of a queue formed at the point-of-sale terminal.

In one aspect, the condition that activates the trigger to perform color region-of-interest extraction 609 is detected by comparing the spatial information contained in the tracking information for a particular track, with spatial information corresponding to the real-world location of the area, and/or comparing the temporal information contained in the tracking information with the real-world temporal information for the particular triggering condition. In another example, a condition such as high number of persons in a queue triggers a snapshot of the queue, which is broadcasted to the management room of a retail store to alert management personnel of the event. In one aspect, the triggering condition is a predetermined behavioral condition. For example, a person visiting a bank and not engaging a teller could be deemed suspicious, and can be automatically detected as determined by comparing the metadata contained in the tracking and analytics information for the particular object. Then, the high resolution color sensor 115b can be used to snap a high resolution picture of the suspicious person.

Finally, at step 630, the correlated image data is stored (either locally in the device 103 and/or in an external server). As described above, the correlated image data generally comprises a combined set of data in which monochromatic images and their associated metadata has been time-correlated and image-correlated to high resolution image data. Thus, a combined data set that enables indexing, searching, and viewing of various types of data in any of the images is generated and stored. As will be understood and appreciated, although aspects of the present system have generally been described in connection with devices 103 and associated software/methods that include at least a pair of monochromatic sensors and at least one high resolution sensor, other types of sensors, arrangements of sensors, numbers of sensors, and the like are possible according to various embodiments of the present disclosure.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network.

In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A multisensor processing system for surveillance, comprising:
   an enclosure for enclosing and mounting components of the system in a unified package mountable to survey a surveillance environment;
   a sensor mounting surface provided within the enclosure, for geometrically arranging sensors before deployment of the system into the surveillance environment;
   a pair of spaced-apart first sensors mounted to the mounting surface arranged to sense within a first field of view, each of the first sensors having a predetermined first resolution and a first frame rate;
   a second sensor mounted to the mounting surface arranged to sense within a second field of view, the second sensor having a second frame rate and a predetermined second resolution higher than the first resolution, wherein the first sensors and the second sensor are spatially positioned on the mounting surface prior to being deployed into the surveillance environment such that the second field of view of the second sensor is coextensive with at least a portion of the first field of view of the pair of spaced-apart first sensors;
   a signal processing subsystem within the enclosure coupled to receive signals from the first sensors and the second sensor, the signal processing subsystem including a programmed processor and memory for storing data and instructions for the processor, the processor operative to execute instructions to:
- (i) receive and store one or more calibration parameters containing data defining the spatial positioning of the first sensors and second sensor on the mounting surface, the respective first field of view and the second field of view, and the first frame rate and second frame rate of the first sensor and second sensor;
- (ii) receive sensor signals from the first sensors and the second sensor after the system is deployed into the surveillance environment;
- (iii) synchronize the first frame rate and second frame rate of the first sensors and the second sensor;
- (iv) rectify the sensor signals from the first sensors and the second sensor to determine an area of coincidence of the first field of view and the second field of view by mapping a particular portion of the first field of view captured by the first sensors and a particular portion of the second field of view captured by the second sensor to a common plane based on the one or more calibration parameters, wherein the common plane defines the area of coincidence corresponding to the particular portion of the first field of view coextensive with the particular portion of the second field of view of the second imaging sensor;
- (v) process the first sensor signals to determine the appearance of an object within the area of coincidence;
- (vi) assign an object identifier to the object appearing within the area of coincidence;
- (vii) generate object metadata corresponding to the persistence of the object having the particular object identifier within the area of coincidence; and
- (viii) provide an output comprising signals from the second sensor, the object identifier, and the object metadata for use by an external processing and data storage system, whereby the signals from the second sensor may be searched and accessed by reference to object identifiers, synchronized frames of the first and second sensors, and/or object metadata.

2. The system of claim 1, wherein the processor is further operative to:
determine a type of object for each object appearing within the first field of view;
assign object type metadata to the object as represented by the object identifier; and
provide the object type metadata as part of the output.

3. The system of claim 2, wherein the processor is further operative to:
determine, from the object metadata and the object type metadata, the occurrence of an event comprising (a) event type data corresponding of one or more predetermined event types and (b) event time signals corresponding to the beginning and ending of the event; and
assign event metadata as a part of the output.

4. The system of claim 3, wherein the event type data corresponds to one or more of retail store checkout counter events comprising: a detected waiting queue exceeding a predetermined number of people, a detected dwell time of a customer exceeding a predetermined time, a detected checkout clerk product handling anomaly, a detected unexpected check clerk absence, a detected customer presence anomaly, a detected maximized customer image.

5. The system of claim 1, wherein the sensor signals comprise video image signals from the first sensors and the second sensor.

6. The system of claim 1, wherein the second sensor comprises a high resolution color video camera mounted between the pair of first sensors.

7. The system of claim 1, wherein the processor is further operative to:
process the first sensor signals to determine a static background for the field of view in a setup operation; and
process the first sensor signals to determine the appearance of an object within the first field of view relative to the static background.

8. The system of claim 1, wherein the processor is further operative to:
determine the exit of an object having an assigned object identifier from the first field of view; and
assign object time metadata corresponding to the exit of the object from the first or second field of view.

9. The system of claim 1, wherein the object metadata comprises object time metadata relating to a time-related characteristic of the object.

10. A method for processing first sensor signals obtained from a first sensor arranged to sense a first field of view of an area under surveillance and second signals from a second sensor arranged to sense a second field of view of the area under surveillance, comprising the steps of:
- (i) receive and store one or more calibration parameters containing data defining a spatial positioning of the first sensor and second sensor on a mounting surface before the system is deployed into a surveillance environment;
- (ii) receive sensor signals from the first sensor and the second sensor after the system is deployed into the surveillance environment, wherein:
  the first sensor signals comprise a first frame rate;
  the second sensor signals comprise a second frame rate lower than the first frame rate;
- (iii) rectifying the sensor signals from the first sensor and the second sensor to determine an area of coincidence of the first field of view and the second field of view by mapping a particular portion of the first field of view captured by the first sensor and a particular portion of the second field of view captured by the second sensor to a common plane based on the one or more calibration parameters, wherein the common plane defines the area of coincidence corresponding to the particular portion of the first field of view coextensive with the particular portion of the second field of view of the second imaging sensor;
- (iv) synchronizing the first frame rate and the second frame rate of the signals of the first sensor and the second sensor;
- (v) processing the first sensor signals to determine the appearance of an object within the area of coincidence;
- (vi) assigning an object identifier to the object appearing within the area of coincidence;
- (vii) assigning object metadata corresponding to the persistence of an object of a particular type having a particular object identifier within the area coincidence; and
- (viii) providing an output comprising signals from the second sensor, the object identifier, and the object metadata for use by an external processing and data storage system, whereby the signals from the second sensor may be searched and accessed by reference to object identifiers, synchronized frames of the first and second sensors, and/or object time metadata.

11. The method of claim 10, further comprising the steps of:
  determining a type of object for the object appearing within the first field of view;
  assigning object type metadata to the object as represented by the object identifier; and
  providing the object type metadata as a part of the output.

12. The method of claim 10, wherein the first signals are received from a pair of first spaced-apart sensors arranged to sense within a first field of view of the area under surveillance, each of the first sensors having a predetermined first resolution, and the second signals are received from a second sensor arranged to sense within a second field of view coextensive with at least a portion of the first field of view, the second sensor having a predetermined second resolution higher than the first resolution.

13. The method of claim 10, further comprising the steps of:
  determining, from the first sensor signals, the occurrence of an event comprising (a) event type data corresponding of one or more predetermined event types and (b) event time signals corresponding to the beginning and ending of the event; and
  assigning event metadata as a part of the output.

14. The method of claim 13, wherein the event type data corresponds to one or more of retail store checkout counter events comprising: a detected waiting queue exceeding a predetermined number of people, a detected dwell time of a customer exceeding a predetermined time, a detected checkout clerk product handling anomaly, a detected unexpected check clerk absence, a detected customer presence anomaly, a detected maximized customer image.

15. The method of claim 10, wherein the sensor signals comprise video image signals from the first sensor and the second sensor.

16. The method of claim 10, wherein the second sensor comprises a high resolution color video camera mounted between the pair of first sensors.

17. The method of claim 10, further comprising the steps of:
  processing the first sensor signals to determine a static background for the field of view in a setup operation; and
  processing the first sensor signals to determine the appearance of an object within the first field of view relative to the static background.

18. The method of claim 10, further comprising the steps of:
  determining the exit of an object having an assigned object identifier from the first field of view; and
  assigning object time metadata corresponding to the exit of the object from the first or second field of view.

19. The method of claim 10, wherein the output comprises a stream of signals from the second sensor and corresponding metadata.

20. A method for monitoring retail sales transactions conducted between customers and a terminal operator utilizing a point-of-sale (POS) terminal and providing metadata-searchable image files corresponding to events detected at the POS terminal, comprising the steps of:
  configuring a first imaging sensor to view within a first field of view encompassing one or more retail customers in a checkout line, the POS terminal, and a terminal operator, the first imaging sensor providing first image signals;
  configuring a second imaging sensor to view within a second field of view that is coextensive with at least a portion of the first field of view of the first imaging sensor, the second imaging sensor having a higher image resolution but a lower frame rate than the first imaging sensor, the second imaging sensor providing second image signals;
  synchronizing the frame rates of the first image signals and the second image signals such that images from a selected set of first image signals correspond in time with images from a selected set of second image signals occurring at the lower frame rate and associating a synchronized time stamp with the synchronized first and second image signals;
  rectifying the sensor signals from the first imaging sensor and the second imaging sensor to determine an area of coincidence of the first field of view and the second field of view by mapping a particular portion of the first field of view captured by the first imaging sensor and a particular portion of the second field of view captured by the second imaging sensor to a common plane based on one or more calibration parameters derived from mounting the first imaging sensor and the second imaging sensor to mounting plate prior to deployment of the system, wherein the common plane defines the area of coincidence corresponding to the particular portion of the first field of view coextensive with the particular portion of the second field of view;
  processing the first image signals to identify objects that appear in the first field of view of the first imaging sensor;
  assigning a person object identifier to objects identified as persons that appear in the first field of view of the first imaging sensor;
  assigning a person object identifier to persons that appear in the first field of view of the first imaging sensor;
  monitoring the persistence of an identified person during a plurality of first image signals;
  determining the exit of the identified person from the first field of view of the first imaging sensor;
  determining a persistence event as comprising an object identifier for an identified person, a time of the synchronized time stamp for appearance of the identified person within the area of coincidence, and a time of the synchronized time stamp of exit of the identified person from the area of coincidence; and
  providing a set of second image signals and corresponding metadata for said set as an output for processing by an external monitoring and data storage system, the metadata comprising the object identifier, persistence event data, and synchronized time stamp data,
  wherein the set of second image signals is delimited by the time stamp of appearance of the identified person and the time stamp of exit of the identified person.

21. The method of claim 20, wherein the method is carried out by an integrated imaging and processing device mounted to survey the checkout line and POS terminal that includes the first imaging sensor, the second imaging sensor, and a programmable processor configured to receive signals from the first imaging sensor and the second imaging sensor and carry out the steps.

22. The method of claim 21, wherein the first signals are received from a pair of first spaced-apart sensors arranged to sense within a first field of view of the area under surveillance, each of the first sensors having a predetermined first resolution, and the second signals are received from a second sensor arranged to sense within a second field of view coextensive with at least a portion of the first field of view, the second sensor having a predetermined second resolution higher than the first resolution.

23. The method of claim 20, wherein a persistence event comprises the entry of an identified person as a customer within a predetermined appropriate interaction distance with the terminal operator.

24. The method of claim 20, wherein a persistence event comprises entry of an identified person as a terminal operator within a predetermined appropriate interaction distance with the POS terminal.

25. The method of claim 20, wherein types of objects other than persons are also identified, and further comprising the steps of:

determining a type of object for an object appearing within the first field of view;

assigning object type metadata to the object as represented by the object identifier; and providing the object type metadata as a part of the output.

26. The method of claim 20, further comprising the steps of:

determining, from the first sensor signals, the occurrence of an event comprising (a) event type data corresponding to one or more predetermined event types and (b) event time signals corresponding to the beginning and ending of the event; and assigning event metadata as a part of the output.

27. The method of claim 26, wherein the event type data corresponds to one or more of retail store checkout counter events comprising: a detected waiting queue exceeding a predetermined number of people, a detected dwell time of a customer exceeding a predetermined time, a detected checkout clerk product handling anomaly, a detected unexpected check clerk absence, a detected customer presence anomaly, a detected maximized customer image.

28. The method of claim 20, wherein the output comprises a stream of signals from the second sensor and corresponding metadata.

29. The system of claim 1, wherein:

the first frame rate is higher than the second frame rate; and the first frame rate is a multiple of the second frame rate.

30. The system of claim 1, wherein the processor is further operative to execute instructions to retrieve the one or more calibration parameters from memory.

\* \* \* \* \*